United States Patent
Chen et al.

(10) Patent No.: US 7,518,688 B2
(45) Date of Patent: Apr. 14, 2009

(54) LIQUID CRYSTAL DISPLAY DEVICE WITH LOW COLOR TRACKING AND FORMING METHOD OF ELECTRODE PLATE

(75) Inventors: Po-Lun Chen, Chia-I (TW); Ming-Feng Tien, Tai-Nan (TW); Jenn-Jia Su, Chia-Yi Hsien (TW); Ming-Chou Wu, Nan-Tou Hsien (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 599 days.

(21) Appl. No.: 11/162,036

(22) Filed: Aug. 26, 2005

(65) Prior Publication Data
US 2006/0244890 A1    Nov. 2, 2006

(30) Foreign Application Priority Data
May 2, 2005    (TW) .............................. 94114134 A (51) Int. Cl.
*G02F 1/1343*    (2006.01)
(52) U.S. Cl. .................. 349/144; 349/38; 349/130; 349/187
(58) Field of Classification Search ............... 349/139, 349/144, 38, 106, 43, 130, 187
See application file for complete search history.

(56) References Cited

U.S. PATENT DOCUMENTS

| | | | |
|---|---|---|---|
| 4,840,460 A | 6/1989 | Bernot | |
| 5,126,865 A | 6/1992 | Sarma | |
| 6,680,771 B2 * | 1/2004 | Yu et al. | 349/139 |
| 7,215,386 B2 * | 5/2007 | Hong et al. | 349/43 |
| 2005/0078263 A1 * | 4/2005 | Kim et al. | 349/144 |

FOREIGN PATENT DOCUMENTS

JP    5-66412    3/1993

* cited by examiner

*Primary Examiner*—Thoi V Duong
(74) *Attorney, Agent, or Firm*—Winston Hsu (57) ABSTRACT

A liquid crystal display device and a forming method of the electrode plate are disclosed. The forming method of the electrode plate includes providing one or more bottom plane electrodes, one or more conductive layers and a dielectric layer, floating the bottom plane electrodes, electrically connecting the conductive layers and an electrode of a thin film transistor, positioning the dielectric layer between the bottom plane electrodes and the conductive layers, utilizing the conductive layers, the dielectric layer and the bottom plane electrodes to form a coupling capacitor, and adjusting the capacitance of the coupling capacitor to control the voltage on the bottom plane electrodes. Therefore, the liquid crystal display device makes every sub-pixel have a predetermined voltage-transmittance characteristic curve by controlling the voltage on the bottom plane electrodes.

5 Claims, 6 Drawing Sheets

LIQUID CRYSTAL DISPLAY DEVICE WITH LOW COLOR TRACKING AND FORMING METHOD OF ELECTRODE PLATE

BACKGROUND OF THE INVENTION

1. Field of the Invention

The present invention relates to a liquid crystal display (LCD) device and a forming method of the plate electrodes thereof, and more specifically, to an LCD device and a forming method of the plate electrodes, utilizing forming a corresponding couple capacitor in a sub-pixel unit to adjust the voltage on the electrode plates for correcting the voltage-transmittance characteristic curve (V-T curve) of the sub-pixel unit, resulting in the elimination of color tracking effects.

2. Description of the Prior Art

In a liquid crystal display (LCD) device, the transmittance of the liquid crystal panel is determined in accordance with the polar vector of light that is controlled via an upper polarizer, a lower polarizer, and a liquid crystal layer. Because of physical characteristics of the liquid crystal, when light passes through the liquid crystal layer, the phase of the light is delayed, so the direction of polarization of the light is variant, and results in different transmittance. This means that when a fixed voltage is applied on two sides of the liquid crystal layer, light with different wavelengths corresponds to different transmittance after passing through the liquid crystal layer and the polarizers.

For a vertical aligned LCD device, the voltage-transmittance characteristic curve (V-T curve) is different with different wavelengths of light; therefore, for trichromatic colors R, G, and B, the corresponding V-T curves are different. Consequently, when the voltage between two sides of the liquid crystal layer is adjusted to regulate the gray-level value of the LCD device, due to the V-T curves of trichromatic colors R, G, and B being different, the mixing ratio of the trichromatic colors R, G, and B is also different, resulting in the named color tracking effect.

Figure 1:
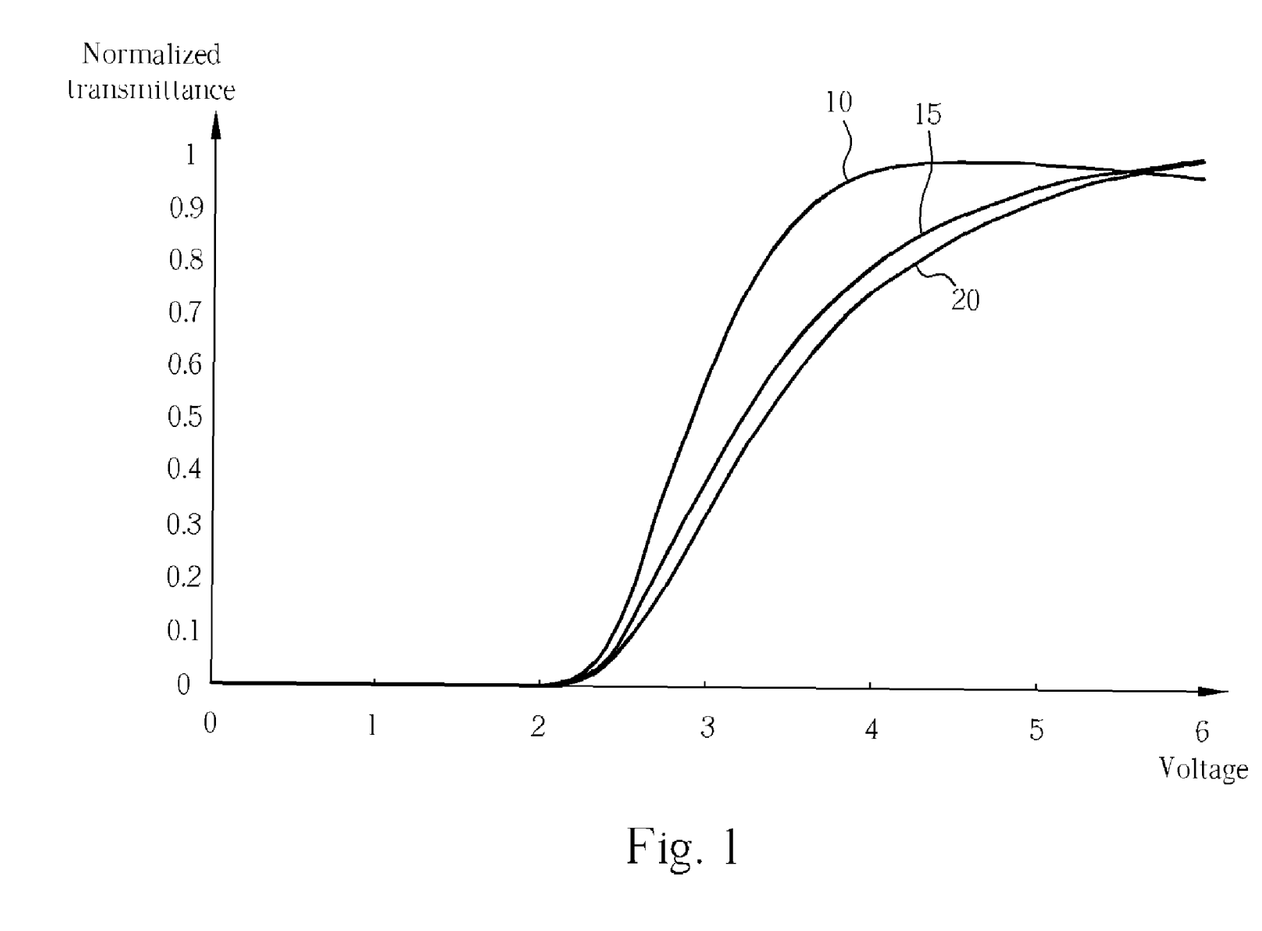
FIG. 1 is a voltage-transmittance characteristic curve of trichromatic colors R, G, and B in a vertical aligned liquid crystal display device according to the prior art.

Please refer to FIG. 1. FIG. 1 is a voltage-transmittance characteristic curve of trichromatic colors R, G, and B in a vertical aligned liquid crystal display device according to the prior art. The horizontal axis represents the voltage applied across the liquid crystal layer, the vertical axis represents normalized transmittance, and the V-T curves 10, 15, 20 correspond to blue light, green light, and red light respectively. As shown in FIG. 1, when the voltage between two sides of the liquid crystal layer is from 2 volts to 6 volts, the transmittance of blue, green, and red light is different, causing the color tracking effect. For example, if the voltage applied across two sides of the liquid crystal layer is 5.5 volts, the ratio of transmittance for red, green, and red light is approximately 1:1:1, and a pure white light is obtained. However, if the voltage applied across two sides of the liquid crystal layer is reduced to 3 volts, the brightness is decreased, and the ratio of transmittance for red, green, and red light becomes 7:7:12 approximately, therefore the original pure white light turns a little blue. As described above, the color tracking effect reduces display performance of related, vertical aligned LCD devices.

SUMMARY OF THE INVENTION

The objective of the claimed invention is to provide a liquid crystal display (LCD) device and a forming method of the plate electrodes that utilizes electrode plates and a dielectric layer to form a proper couple capacitor in a sub-pixel unit to adjust the V-T curve of the sub-pixel unit to solve the above-mentioned problems.

According to an embodiment of the claimed invention, a forming method of the electrode plates is disclosed. The method includes positioning one or more lower plate electrodes, one or more conductive layers, and a dielectric layer, floating the lower plate electrodes, electrically connecting the conductive layers to one port of a thin-film transistor (TFT), and positioning the dielectric layer between the conductive layers and the lower plate electrodes; utilizing the conductive layers, the dielectric layer, and the lower plate electrodes to form a couple capacitor, and adjusting the capacitance of the couple capacitor to control the voltage on the lower plate electrodes.

According to an embodiment of the claimed invention, a forming method of an LCD device is disclosed. The method includes setting a plurality of sub-pixel units; setting one or more first liquid crystal layers, one or more first upper plate electrodes, one or more first lower plate electrodes, one or more first conductive layers, and a first dielectric layer in a first sub-pixel unit, positioning the first liquid crystal layer between the first upper plate electrodes and the first lower plate electrodes, floating the first lower plate electrodes, positioning the first conductive layers on one side of the first lower plate electrodes, electrically connecting the first conductive layers with one port of a first TFT, and positioning the first dielectric layer between the first conductive layers and the first lower plate electrodes; utilizing the first conductive layers, the first dielectric layer, and the first lower plate electrodes to form a first couple capacitor, and adjusting the capacitance of the first couple capacitor to control the voltage on the first lower plate electrodes, causing the first sub-pixel unit to possess a predetermined voltage-transmittance characteristic curve (V-T curve); setting a second liquid crystal layer, one or more second upper plate electrodes, one or more second lower plate electrodes, one or more second conductive layers, and a second dielectric layer in a second sub-pixel unit, positioning the second liquid crystal layer between the second upper plate electrodes and the second lower plate electrodes, floating the second lower plate electrodes, positioning the second conductive layers on one side of the second lower plate electrodes, electrically connecting the second conductive layers with one port of a second TFT, and positioning the second dielectric layer between the second conductive layers and the second lower plate electrodes; and utilizing the second conductive layers, the second dielectric layer, and the second lower plate electrodes to form a second couple capacitor, and adjusting the capacitance of the second couple capacitor to control the voltage on the second lower plate electrodes, causing the second sub-pixel unit to possess substantially the predetermined V-T curve.

According to an embodiment of the claimed invention, an LCD device is disclosed. The device includes at least two sub-pixel units, the first sub-pixel unit including one or more first upper plate electrodes; one or more first lower plate electrodes, which are floating; a first liquid crystal layer, positioned between the first upper plate electrodes and the first lower plate electrodes; one or more first conductive layers, positioned at one side of the first lower plate electrodes and electrically connected with one port of a first TFT, the first conductive layers forming a first couple capacitor with the first lower plate electrodes to adjust the first sub-pixel unit to possess a predetermined V-T curve; and a first dielectric layer, positioned between the first conductive layers and the first lower plate electrodes; the second sub-pixel unit including one or more second upper plate electrodes; one or more second lower plate electrodes, which are floating; a second liquid crystal layer, positioned between the second upper plate electrodes and the second lower plate electrodes; one or more second conductive layers, positioned at one side of the second lower plate electrodes and electrically connected with one port of a second TFT, the second conductive layers forming a second couple capacitor with the second lower plate electrodes to adjust the second sub-pixel unit to possess the predetermined V-T curve substantially; and a second dielectric layer, positioned between the second conductive layers and the second lower plate electrodes; wherein the first and second couple capacitors correspond to different capacitances respectively.

The claimed invention, a liquid crystal display (LCD) device and a forming method of the plate electrode thereof, adjusts the V-T curve of the sub-pixel unit via adjusting the capacitance of the couple capacitor. Therefore, by utilizing methods disclosed in the present invention to adjust the capacitance of the couple capacitor in the sub-pixel unit, voltages on the electrode plates in R, G, B, named trichromatic sub-pixel units are adjusted respectively. That is to say, when the voltage between two sides of the liquid crystal layer is adjusted to regulate the gray-level value of the LCD device, due to the voltage dividing effect of the couple capacitor, the actual voltage drop on the electrode plate is changed. Through proper adjustment, the transmittance of R, G, and B sub-pixel units remains 1:1:1, therefore the known color tracking effect is eliminated.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
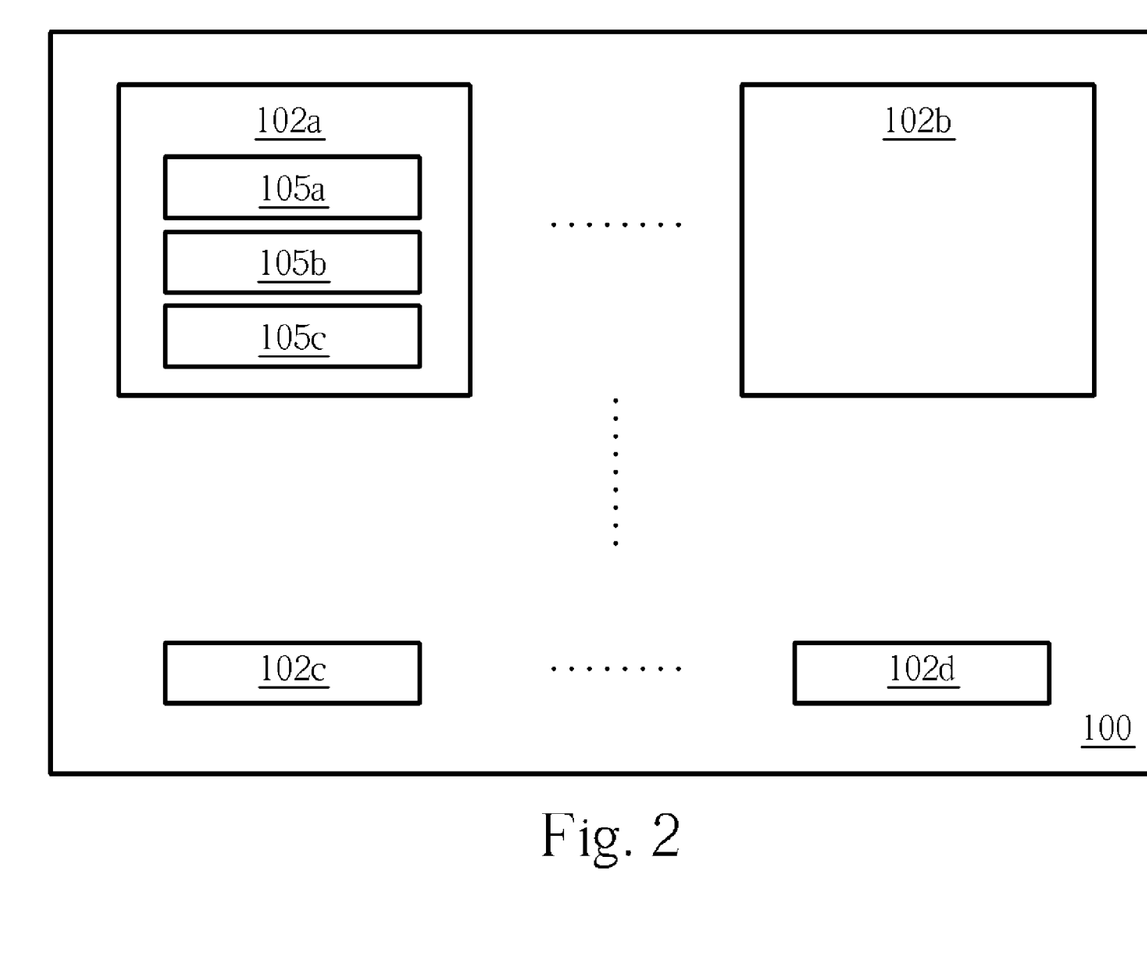
FIG. 2 is a diagram of a liquid crystal display device according to the present invention.
Figure 3:
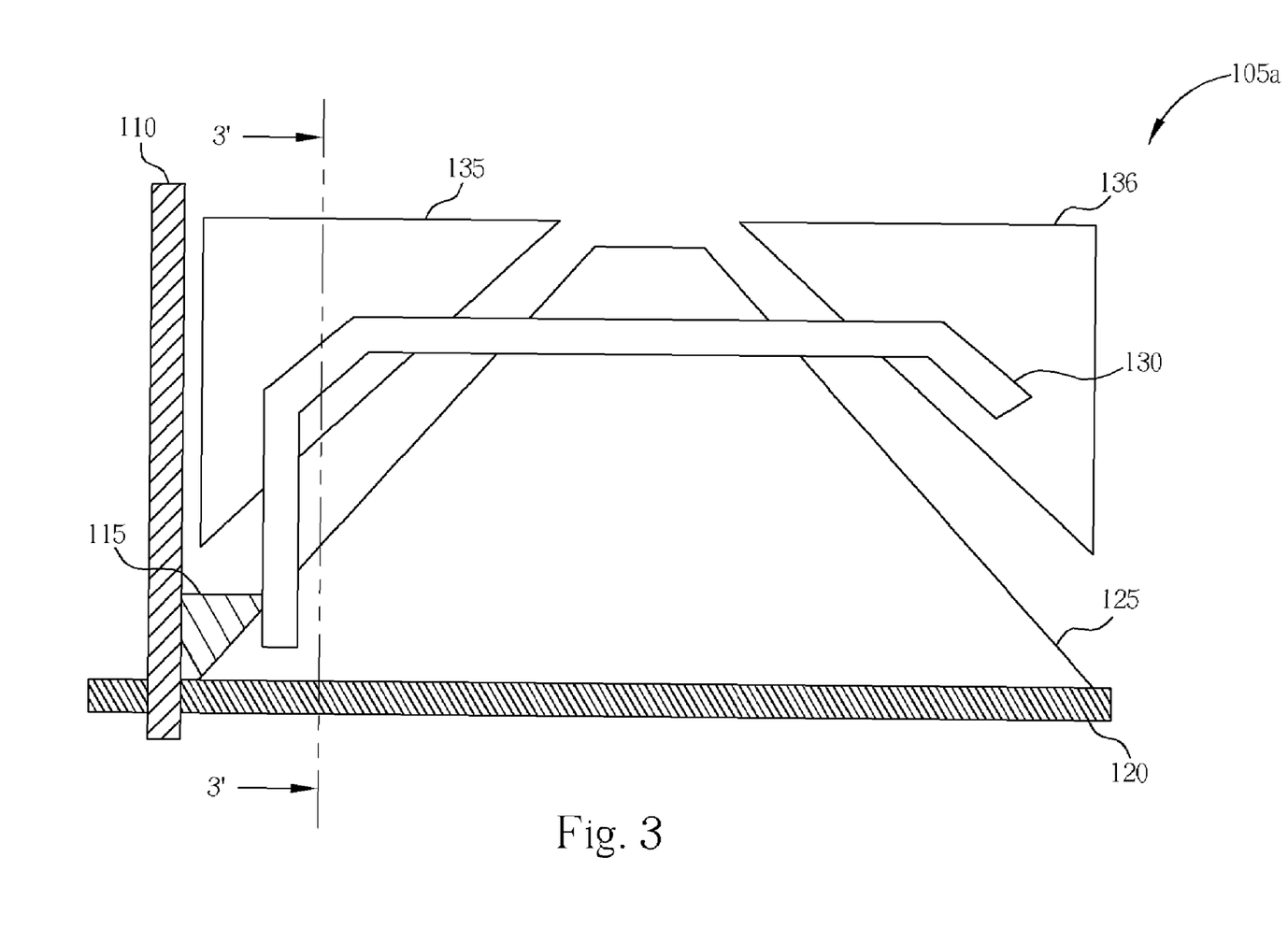
FIG. 3 is a structure diagram of the liquid crystal display device and the electrode plate thereof shown in FIG. 2.

Please refer to FIG. 2. FIG. 2 is a diagram of a liquid crystal display (LCD) device 100 according to the present invention. The LCD device 100 (for example, a vertical aligned LCD device) includes a plurality of pixel units 102a-102d aligned as a matrix, where every pixel unit 102a, 102b, 102c, and 102d respectively includes a plurality of sub-pixel units. For example, there are three sub-pixel units 105a, 105b, and 105c positioned in pixel unit 102a, corresponding to trichromatic colors R, G, and B respectively. The pixel unit 102a corresponds to a desired color through controlling the brightness of red light, green light, and blue light outputted from the sub-pixel units 105a, 105b, and 105c. Please refer to FIG. 3. FIG. 3 is a structure diagram of the sub-pixel unit 105a and the electrode plate thereof shown in FIG. 2. In the following disclosure, only structural components of the sub-pixel unit 105a that are relevant to the present invention are illustrated and described, for the purposes of clarity and simplicity. In the embodiment, the sub-pixel unit includes a gate line 110 connected to the gate port of a thin-film transistor (TFT) 115, wherein the function of the TFT 115 is a switch, the drain port and the source port of the TFT 115 are two ends of the switch respectively, and the gate line 110 transmits a gate voltage to control the TFT 115 conducting the drain port and the source port to turn on the switch. The drain port of the TFT 115 is connected to a data line 120 for receiving a voltage signal for controlling a gray-level value of the sub-pixel unit 105a. The source port of the TFT 115 is connected to a lower plate electrode 125 and a conductive layer 130 via a through hole, therefore, in the TFT 115, when the drain port is conducting to the source port, the voltage signal for controlling the gray-level value is transmitted to the lower plate electrode 125 and the conductive layer 130 through the source port of the TFT 115.

Figure 4:
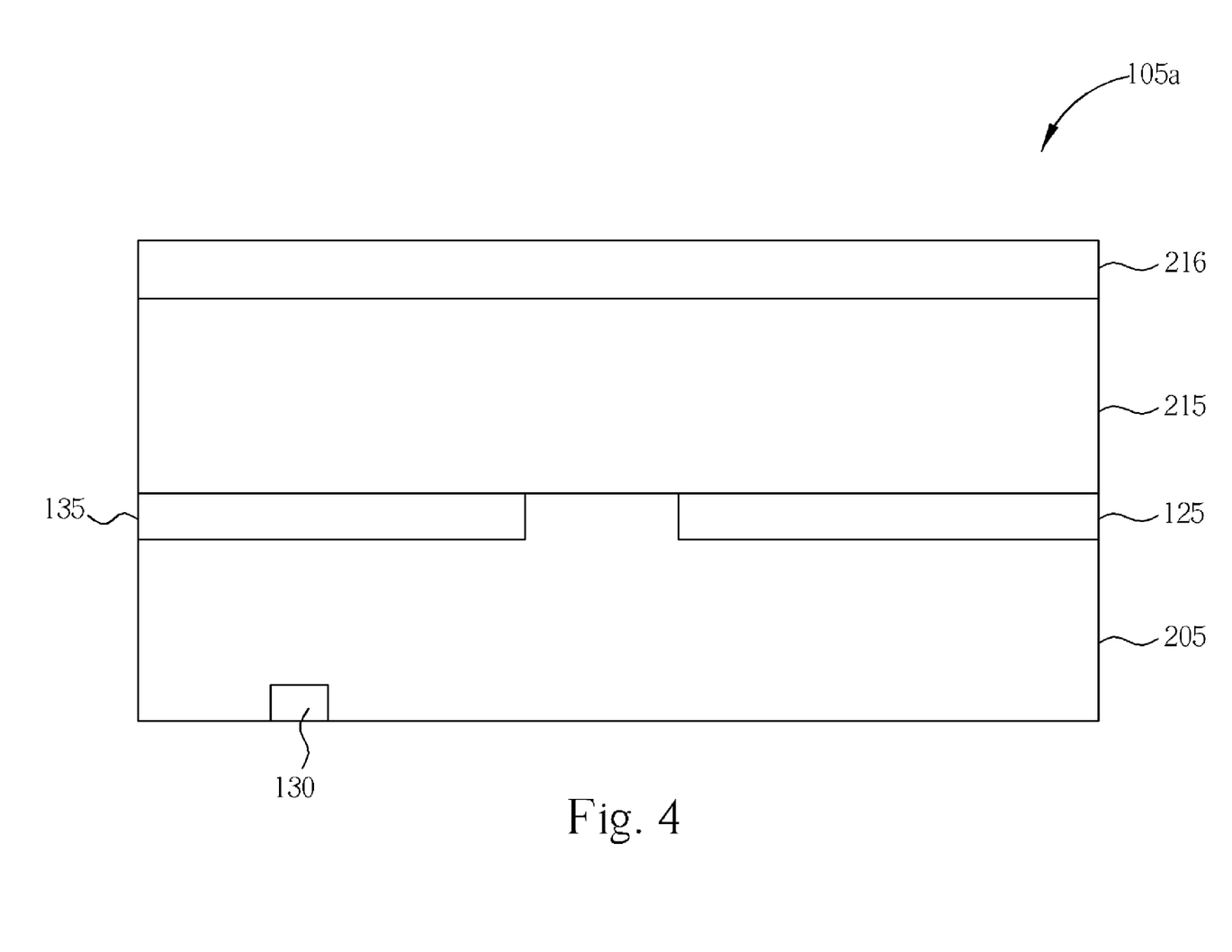
FIG. 4 is a sectional drawing along a cut line 3'-3' of the liquid crystal display device and the electrode plate thereof shown in FIG. 3.

The sub-pixel unit 105a further includes a plurality of floating lower plate electrodes 135, 136 that are not connected with other conductive layers, where lower plate electrodes 125, 135, and 136 form an electrode plate. Please note that there are three lower plate electrodes 125, 135, and 136 illustrated in FIG. 3, however, in a practical condition, the number of lower plate electrodes in the sub-pixel unit 105a is not limited, and is adjustable according to a real requirement. The operation principle is described as follows. Note that the conductive layer 130 is not at the same level as the electrode plates described above (i.e. lower plate electrodes 125, 135, and 136). Please refer to FIG. 4. FIG. 4 is a sectional drawing along a cut line 3'-3' of the sub-pixel unit 105a and the electrode plate thereof shown in FIG. 3. As illustrated by FIG. 4, there is a dielectric layer 205 positioned between the conductive layer 130 and the lower plate electrode 135, additionally, a liquid crystal layer 215 and an upper plate electrode 216 are positioned on the lower plate electrodes 135 and 125, wherein the liquid crystal layer 215 includes a plurality of liquid crystal molecules and the upper plate electrode 216 is used as a common electrode COM. It is well known that the sub-pixel unit 105a further includes polarizers and color filters; as these components are not related to the technical features in the claimed invention, the structure and function of these components are not described in the specification. Please note that the liquid crystal layer 215 is the same as other liquid crystal layers installed in well-known LCD devices. The lower plate electrodes 125, 135 and the upper plate electrode 216 can be transparent conductive layers by utilizing ITO or IZO as materials, and the conductive layer 130 is allowed to use opaque and conductive materials, such as metal.

Figure 5:
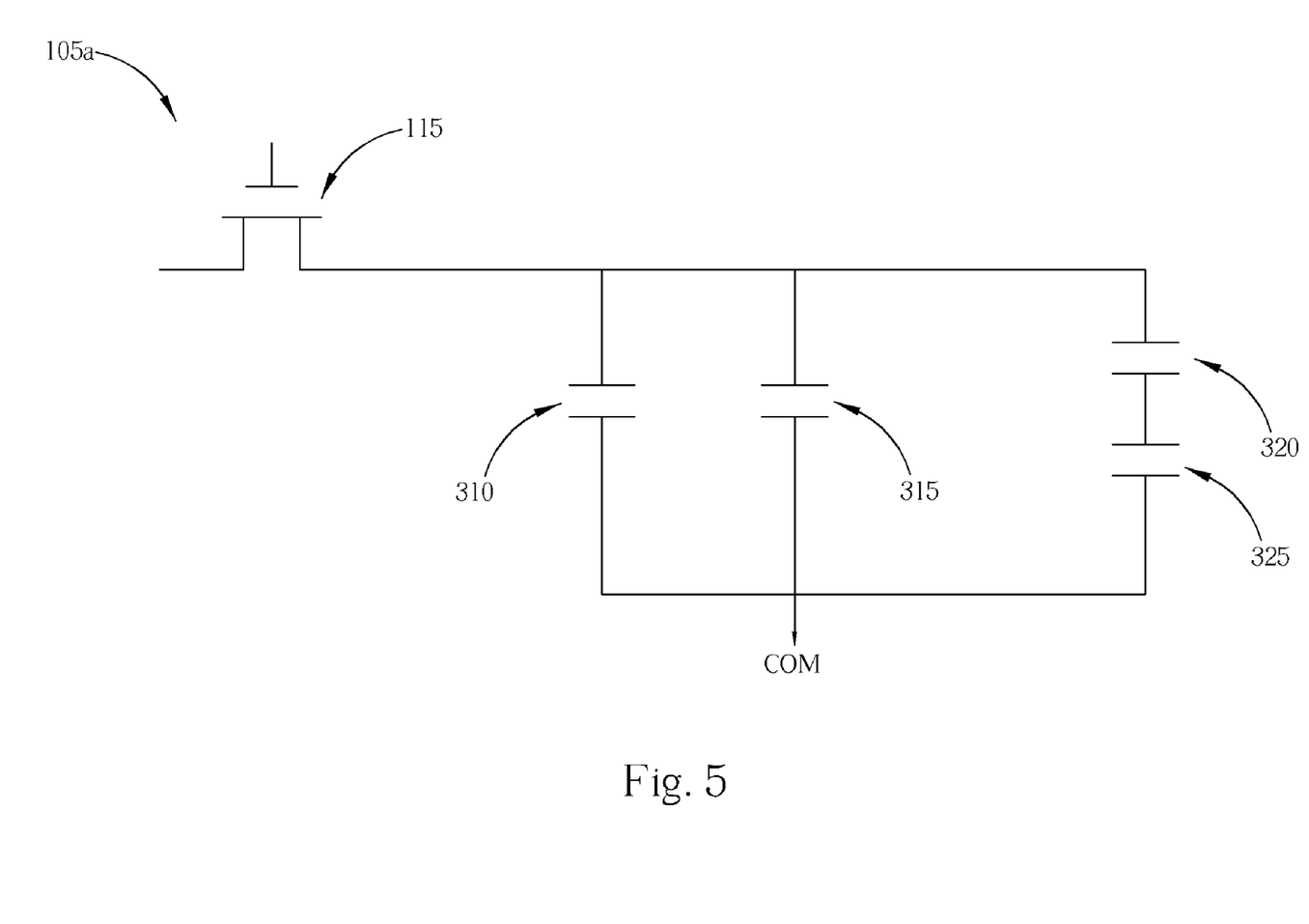
FIG. 5 is an effective circuitry of the sub-pixel unit shown in FIG. 2.

Please refer to FIG. 3, FIG. 4 and FIG. 5. FIG. 5 is an effective circuitry of the sub-pixel unit 105a shown in FIG. 2. The capacitor 315 is an effective capacitor formed by the lower plate electrode 125 and the electrode at the other side of the liquid crystal layer 215 (i.e. the upper plate electrode 216) when a voltage signal is transmitted from the source port of the TFT 115 to the lower plate electrode 125, wherein the liquid crystal layer 215 is the dielectric layer of the capacitor 315. The couple capacitor 320 is an effective capacitor formed by the conductive layer 130 and the floating lower plate electrodes 135, 136 when a voltage signal is transmitted from the source port of the TFT 115 to the conductive layer 130, wherein the dielectric layer 205 is the dielectric layer of the couple capacitor 320. The capacitor 325 is an effective capacitor formed by the floating lower plate electrode 135 and the electrode at the other side of the liquid crystal layer 215 (i.e. the upper plate electrode 216), wherein the liquid crystal layer 215 is the dielectric layer of the capacitor 325. Lastly, the storage capacitor 310 is an effective capacitor formed by other elements of the sub-pixel unit 105*a*. According to the description above, the couple capacitor 320 is connected in series with the capacitor 325 and then connected in parallel with the capacitor 315 and the storage capacitor 310. This is because the couple capacitor 320 formed by the conductive layer 130 and the floating lower plate electrodes 135, 136 causes a voltage dividing effect, so the capacitance of the couple capacitor 320 influences the voltage actually dropping on two sides of the capacitor 325, and therefore the status of the liquid crystal layer 215 will be changed. Consequently, the voltage-transmittance characteristic curve (V-T curve) of the sub-pixel unit 105*a* is adjustable, and the operation principle is described below.

Two extreme conditions are considered; the first condition is: if the floating lower plate electrodes 135, 136 are all replaced by the lower plate electrode 125 (i.e. all the electrode plates are constructed by the lower plate electrode 125), the layer below the liquid crystal layer 215 is formed by the lower plate electrode 125 completely. This causes the couple capacitor 320 and the capacitor 325 shown in FIG. 5 to disappear, and the voltage applied on the upper plate electrode 216 and the conductive layer 130 is the voltage across two sides of the liquid crystal layer 215. In this condition, the V-T curve of the sub-pixel unit 105*a* is shown in FIG. 1. The second condition is: if the floating lower plate electrodes 135, 136 replaces the lower plate electrode 125 completely (i.e. all the electrode plates are constructed by the lower plate electrode 135, 136), then the capacitor 315 shown in FIG. 5 disappears. In this condition, the voltage applied on the upper plate electrode 216 and the conductive layer 130 equals the sum of voltages that drop on the couple capacitor 320 and the capacitor 325 respectively. In other words, the voltage actually applied on two sides of the liquid crystal layer 215 (i.e. the voltage drop across two sides of the capacitor 325) is less than the voltage applied on the upper plate electrode 216 and the conductive layer 130. When the capacitance of the couple capacitor 320 increases, the voltage drop across two sides of the capacitor 325 decreases, meaning that the voltage actually applied on the liquid crystal layer 215 decreases. Then, the V-T curve corresponding to the sub-pixel unit 105*a* shown in FIG. 1 shifts to the right, and the amount of shift is adjustable by controlling the capacitance of the couple capacitor 320. If the lower plate electrode 125 and the floating lower plate electrodes 135, 136 all exist, that is to say that the capacitor 315, the couple capacitor 320, and the capacitor 325 all exist, then the V-T curve of the sub-pixel unit 105a combines with the V-T curves of the two extreme conditions discussed above. Therefore, the area ratio of the lower plate electrode 125 and the floating lower plate electrodes 135, 136 influences the ratio of the V-T curves of two extreme conditions in a combined final V-T curve.

Figure 6:
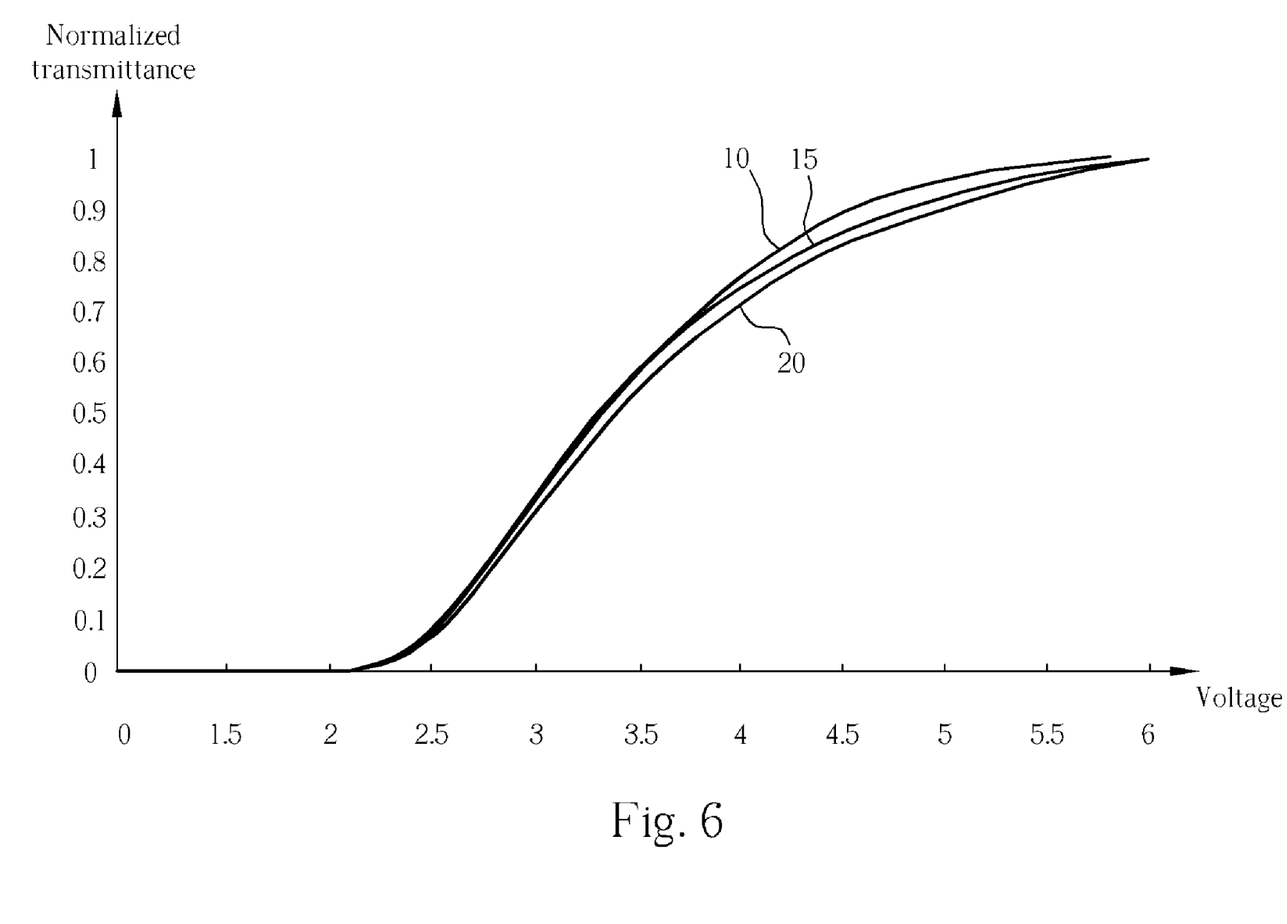
FIG. 6 is a voltage-transmittance characteristic curve of trichromatic colors R, G, and B according to the present invention.

In the embodiment, the sub-pixel unit 105*a* corresponds to red light, and there is no conductive layer 130 positioned to form the couple capacitor 320 with the floating lower plate electrodes 135, 136. For the sub-pixel units 105*b*, 105*c* corresponding to green light and blue light respectively, the original V-T curve is adjustable by adding a suitable couple capacitor 320 (for example, shifting the V-T curve 10, 15 shown in FIG. 11 to the right). The result is shown in FIG. 6. FIG. 6 is a voltage-transmittance characteristic curve of trichromatic colors R, G, and B according to the present invention. As illustrated in FIG. 6, when the voltage drops from 2 volts to 6 volts, three V-T curves 10, 15, 20 corresponding to blue light, green light, and red light respectively will nearly overlap. In other words, regardless of what the voltage value is, the transmittance ratio of trichromatic colors R, G, and B approaches 1:1:1, and therefore the well-known color tracking effect is eliminated. According to experiments, the best area ratio of the floating lower plate electrode (i.e. area sum of lower plate electrodes 135, 136) and the electrode plate (i.e. area sum of lower plate electrodes 125, 135, and 136) in the sub-pixel units 105*a*, 105*b*, and 105*c* corresponding to trichromatic colors R, G, and B respectively is: 0 (red light), 0.2 (green light), and 0.5 (blue light). Please note that the embodiment mentioned above discloses how to adjust the V-T curves of the sub-pixel units 105*b* and 105*c* corresponding to green light and blue light respectively, however, all V-T curves of the sub-pixel units 105*a*, 105*b*, and 105*c* corresponding to red light, green light, and blue light are adjustable according to practical requirements, by setting proper couple capacitors to correct the transmittance ratio of trichromatic colors R, G, and B in the pixel unit 102*a* approaching 1:1:1, this is also covered by the claimed invention.

As mentioned above, adjusting the capacitance of the couple capacitor 320 in the sub-pixel unit 105*a* can vary the voltage on the lower plate electrodes 135, 136 to adjust the V-T curve. Therefore, the voltage on the lower plate electrodes 135, 136 is adjusted through changing parameters listed below:

(a) changing the shape, or area of the conductive layer 130 to adjust the capacitance of the couple capacitor 320 for controlling the voltage on the lower plate electrodes 135, 136;

(b) changing the shape, or area of the floating lower plate electrodes 135, 136 to adjust the capacitance of the couple capacitor 320 for controlling the voltage on the lower plate electrodes 135, 136;

(c) changing the numbers of lower plate electrodes 135, 136 positioned in the sub-pixel unit 105*a* to adjust the capacitance of the couple capacitor 320 for controlling the voltage on the lower plate electrodes 135, 136;

(d) changing the material, or thickness of the dielectric layer 215 to adjust the capacitance of the couple capacitor 320 for controlling the voltage on the lower plate electrodes 135, 136; and (e) adjusting areas of the lower plate electrodes 135, 136 such that the area ratio compared to the electrode plate area (i.e. area sum of lower plate electrodes 125, 135, and 136) achieves a predetermined area ratio value, and the voltage on the lower plate electrode 135, 136 is controlled by adjusting the predetermined area ratio value.

In general, a pixel unit includes a plurality of sub-pixel units, taking the pixel unit 102*a* in the embodiment for example, it includes sub-pixel units 105*a*, 105*b*, and 105*c*, corresponding to three colors—red, green, and blue. However, it is possible to replace these colors with other colors; for this condition, the capacitance of the couple capacitor in a first sub-pixel unit (for example, 105*a*) is adjusted first to control the first sub-pixel unit possessing a predetermined V-T curve. The adjusting method is described above. Next, in the same pixel unit 102*a*, the capacitance of the couple capacitor in a second sub-pixel unit is adjusted (for example, 105*b*) to control the second sub-pixel unit possessing the same V-T curve as the first sub-pixel unit. The adjusting method of the capacitance of the couple capacitor is also described above, but is allowed to differ from the adjusting method applied in the first sub-pixel unit. Other sub-pixel units are adjusted in turn, until all sub-pixel units included in the pixel unit 102*a* possess substantially the same V-T curve.

In short, the present invention, the LCD device 100, includes a plurality of sub-pixel units. Taking the sub-pixel unit 105a for example, floating lower plate electrodes 135, 136 are utilized and a conductive layer 130 (electrically connected to one port of the TFT 115) is positioned at one side of the lower plate electrodes 125, 135, and 136 to form a required couple capacitor 320. Therefore, the V-T curve of the sub-pixel unit 105a can be adjusted by adjusting the capacitance of the couple capacitor 320. In other words, through assistance of the couple capacitor 320, the LCD device 100 disclosed in the claimed invention substantially eliminates the well-known color tracking effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A forming method of a liquid crystal display (LCD) device, the method comprising:
   (a) setting a plurality of sub-pixel units;
   (b) setting a first liquid crystal layer, one or more first upper plate electrodes, one or more first lower plate electrodes, one or more first conductive layers, and a first dielectric layer between the one or more first lower plate electrodes and the one or more first conductive layers in a first sub-pixel unit, positioning the first liquid crystal layer between the first upper plate electrode and the first lower plate electrode, positioning the first conductive layers on one side of the first lower plate electrodes, electrically connecting the first conductive layers and the one or more first lower plate electrodes with one port of a first thin-film transistor (TFT), wherein the first sub-pixel unit has no floating electrode between the first liquid crystal layer and the one or more first conductive layers, and possesses a predetermined voltage-transmittance characteristic curve (V-T curve);
   (c) setting a second liquid crystal layer, one or more second upper plate electrodes, one or more second lower plate electrodes, one or more second conductive layers, and a second dielectric layer between the one or more second lower plate electrodes and the one or more second conductive layers in a second sub-pixel unit, positioning the second liquid crystal layer between the second upper plate electrodes and the second lower plate electrodes, floating the one or more second lower plate electrodes, positioning the second conductive layers on one side of the second lower plate electrodes, electrically connecting the second conductive layers with one port of a second TFT, and positioning the second dielectric layer between the second conductive layers and the second lower plate electrodes; and
   (d) utilizing the one or more second conductive layers, the second dielectric layer, and the one or more second lower plate electrodes to form a second couple capacitor, and adjusting the capacitance of the second couple capacitor to control the voltage on the second lower plate electrodes, causing the second sub-pixel unit to possess substantially the predetermined V-T curve.

2. The method of claim 1, wherein the plurality of sub-pixel units is positioned in a vertical aligned LCD device.

3. The method of claim 1, wherein the first and second couple capacitors respectively correspond to different capacitances.

4. A liquid crystal display (LCD) device, the device comprising:
   a first sub-pixel unit, comprising:
      one or more first upper plate electrodes;
      one or more first lower plate electrodes, which are electrically connected with one port of a first thin-film transistor (TFT);
      a first liquid crystal layer, positioned between the first upper plate electrodes and the first lower plate electrodes;
      one or more first conductive layers, positioned at one side of the first lower plate electrodes and electrically connected with the port of the first thin-film transistor, wherein the first sub-pixel unit has no floating electrode between the first liquid crystal layer and the one or more first conductive layers, and possesses a predetermined voltage-transmittance characteristic curve (V-T curve); and
      a first dielectric layer, positioned between the first conductive layers and the first lower plate electrodes;
   a second sub-pixel unit, comprising:
      one or more second upper plate electrodes;
      one or more second lower plate electrodes, which are floating;
      a second liquid crystal layer, positioned between the second upper plate electrodes and the second lower plate electrodes;
      one or more second conductive layers, positioned at one side of the second lower plate electrodes and electrically connected with one port of a second thin-film transistor (TFT), the second conductive layers forming a second couple capacitor with the second lower plate electrodes for adjusting the second sub-pixel unit to possess the predetermined V-T curve substantially; and
      a second dielectric layer, positioned between the second conductive layers and the second lower plate electrodes;
   wherein the first and second couple capacitors correspond to different capacitances respectively.

5. The liquid crystal display (LCD) device of claim 4, wherein the liquid crystal display (LCD) device is a vertical aligned liquid crystal display (LCD) device.

* * * * *